United States Patent [19]

Thomas

[11] 4,151,879

[45] May 1, 1979

[54] METHOD FOR ACIDIZING A SUBTERRANEAN FORMATION

[75] Inventor: Ronnie L. Thomas, Tulsa, Okla.

[73] Assignee: The Dow Chemical Company, Midland, Mich.

[21] Appl. No.: 824,754

[22] Filed: Aug. 15, 1977

[51] Int. Cl.$^2$ ............................................. E21B 43/27
[52] U.S. Cl. .................................................... 166/307
[58] Field of Search ............... 166/259, 271, 273, 274, 166/281, 307; 252/8.55 C

[56] References Cited

U.S. PATENT DOCUMENTS

| | | | |
|---|---|---|---|
| 2,094,479 | 9/1937 | Vandergrift | 166/271 X |
| 2,223,397 | 12/1940 | White et al. | 166/291 X |
| 2,300,393 | 11/1942 | Ayers | 252/8.55 C |
| 2,367,350 | 1/1945 | Heigl | 166/307 |
| 2,425,415 | 8/1947 | Bond et al. | 166/307 |
| 2,663,689 | 12/1953 | Kingston et al. | 166/307 X |
| 2,679,294 | 5/1954 | Bond et al. | 166/307 X |
| 2,885,004 | 5/1959 | Perry | 166/307 |
| 3,283,816 | 11/1966 | Bradley | 166/307 |
| 3,441,085 | 4/1969 | Gidley | 166/307 |
| 3,543,856 | 12/1970 | Knox et al. | 166/307 X |

*Primary Examiner*—Stephen J. Novosad
*Assistant Examiner*—George A. Suchfield

[57] ABSTRACT

The permeability of a subterranean formation is increased by injecting into the formation, a conventional mud acidizing solution (HCl/HF) followed by a fluoboric acid solution. Use of fluoboric acid as an overflush is believed to deter clay migration and thereby significantly reduce or delay production decline which is often otherwise encountered shortly after conventional mud acidizing treatments.

41 Claims, No Drawings

METHOD FOR ACIDIZING A SUBTERRANEAN FORMATION

BACKGROUND OF THE INVENTION

A. Field of the Invention

The invention relates to a method for increasing the permeability of a subterranean formation, wherein the permeability increase is achieved by contacting the formation with an acidic solution to dissolve a portion of the formation. It more particularly relates to an acidizing method of the type employing mud acid.

B. Description of the Prior Art

Numerous procedures for treating wells with siliceous-material-dissolving acids are known. A good discussion of the known art is found in columns 1 and 2 of Templeton et al., U.S. Pat. No. 3,828,854 and in the "Introduction" section of Society of Petroleum Engineers Paper No. 5153, which paper relates to the same invention as the Templeton et al. patent.

Conventionally, siliceous formations have been acidized by contact with mud acid. As used herein, "mud acid" refers to an aqueous solution of hydrofluoric acid and at least one of hydrochloric acid, acetic acid, or formic acid; usually, the acid in addition to HF is HCl. As is well understood in the art, the derivation of the HCl and HF is not critical, so that "mud acid" also includes aqueous solutions of chemicals which quickly react to form HCl and HF, i.e., so that by the time the solution reaches the formation, the active ingredients are HF and HCl. The respective concentrations of HCl and HF may vary over wide ranges, with the lower limits being more a matter of practicality rather than operability, and the upper limits being a matter of mutual solubility of the two acids. Thus, any given mud acid solution may have an HCl concentration, by weight, of from about 1 percent or even less up to about 37 percent, and an HF concentration of from about 0.5 percent or even less up to about 25 percent, though as the upper limit is approached for one species, a lesser concentration of the other may be required because of solubility limitations. Most typically, a mud acid is substantially free of other acidic species, consisting substantially of from about 3 to about 25 percent HCl and about 1 to about 10 HF. A mud acid may also contain one or more functional additives such as inhibitors, diverting agents, and/or surfactants, and such functional additives are not to be considered excluded by the expression "consisting substantially of".

Conventional treatments of siliceous clay containing formations with mud acids have generally given excellent results for a short time, but the improvements in production are frequently short lived, with a rapid decline in production being observed thereafter. It has been hypothesized that this phenomenon is observed because the mud acid reacts rapidly with the formation in the first few inches around the borehole, thus spending so rapidly that penetration deep into the formation is not achieved. Subsequently, fines in the surrounding formation migrate into the vicinity of the borehole and replug the acidized portion of the formation.

One approach to this problem is that taught by Templeton et al. in the aforementioned patent and publication. They teach to inject a composition which generates HF slowly, and thus enables the solution to be placed in contact with the formation before any significant amount of the HF is generated. The system there described is a relatively high pH ($\geq 2$) aqueous solution of a water soluble fluoride salt and at least one water reactive organic acid ester. From the examples in the patent and paper, it appears that the ester most preferred by Templeton et al. is methyl formate.

An alternative method for acidizing sand formations would be desirable, however, since the method of Templeton et al. suffers from at least two drawbacks. First, many of the organic esters are highly flammable materials which objectionable from a safety standpoint. Second, as Templeton et al. acknowledge, the fluoride salt-organic ester system actually causes at least temporary formation damage since it causes precipitation of biproducts such as ralstonite.

As further background, the use of fluoboric acid in well treating has been previously described. Ayers, Jr., U.S. Pat. No. 2,300,393 teaches treatment with fluoboric acid, optionally with small amounts of HF. Ayers, Jr., warns against using large excesses of HF. Ayers, Jr., also teaches the fluoboric acid may be followed by HCl containing no appreciable amount of hydrofluoric acid, or optionally, by a mixture of HCl and fluoboric acids. Bond et al., U.S. Pat. No. 2,425,415 teaches an acidizing procedure wherein the formation is first contacted with a fluoboric acid solution which contains no free HF, but which contains an excess of boric acid, and thereafter with aqueous fluoboric acid containing excess HF. Kingston et al., U.S. Pat. No. 2,663,689 describes the use of boric acid in aqueous HCl-HF to avoid precipitation of insoluble fluoride salts and fluorosilicic acid.

SUMMARY OF THE INVENTION

The present invention is a method for increasing the permeability of a subterranean formation by injecting fluoboric acid into the formation as an overflush following injection of a mud acidizing solution. The method is particularly effective for stimulating formations of the type which exhibit an initial production increase following a conventional mud acidizing treatment but which normally suffer a rapid production decline thereafter. The present treatment permits a prolonged period of increased production from such formations. Although the present invention is not limited by any particular theory, the beneficial results are believed attained because the fluoboric acid stabilizes formation fines deep within the formation by slowly reacting to form borosilicates on the surface of the clays and feldspars, thereby restricting migration of the fines. In contrast to the organic ester system of Templeton et al., a low pH of about 1 or less is maintained, which helps prevent precipitation of hexafluorosilicates, and fluorides.

FURTHER DESCRIPTION OF THE INVENTION

Any suitable mud acid solution may be employed, as hereinabove described.

The fluoboric acid solution may be prepared in any convenient manner. Ayers, U.S. Pat. No. 2,300,393, for example, teaches preparation of fluoboric acid by mixing boric and hydrofluoric acids. Alternatively, boric acid may be added to ammonium fluoride or ammonium bifluoride in the presence of an approximately stoichiometric amount of HCl. For example, an approximately 8 weight percent solution of fluoboric acid may be prepared by admixing the following:

|  | U. S. | Metric |
|---|---|---|
| Water | 340 gal | 1.36 m$^3$ |
| Ammonium bifluoride | 500 lb. | 240 kg |

-continued

|  | U. S. | Metric |
|---|---|---|
| 35 wt % HCl | 97 gal | 0.388 m |
| Boric acid | 250 lb | 120 kg |
| Total, approximately | 500 gallons | 2 m³ |

Other variations will be readily apparent to those skilled in the art. For example, another suitable fluoboric acid solution may be prepared employing a mixture of HCl and HF as starting materials, e.g., by admixing the following:

|  | U. S. | Metric |
|---|---|---|
| Water | 370 gal | 1.48 m³ |
| Ammonium bifluoride | 250 lb | 120 kg |
| Aqueous soln. of, by weight, 25% HCl and 20% HF | 84 gal | 0.366 m³ |
| Boric acid | 250 lb | 120 kg |
| Total, approximately | 500 gallons | 2 m³ |

The concentration of fluoboric acid solution is not sharply critical so long as the concentration and amount employed are effective to achieve an observable improvement in stabilization of the clays and fines in the remote areas of the formation. Such a stabilizing effect can be recognized by improved production over a more prolonged period of time than would have been predicted based on previous experience in that field, or, for example, by laboratory techniques such as core flow tests or by examination of a formation sample using a scanning electron microscope as discussed in Society of Petroleum Engineers Paper No. 6007. Generally, however, solutions of from about 1 weight percent or less up to about 48 weight percent $HBF_4$ may be employed. More preferably, the fluoboric acid solution consists substantially of from about 2 to about 20 weight percent $HBF_4$. Preferably, the fluoboric acid solution consists substantially of fluoboric acid, i.e., optionally includes, functional additives such as a corrosion inhibitor, diverting agent, or the like, but containing (when injected) less than about 2% HCl and less than about 1% HF.

In a typical treatment, a preflush such as toluene, xylene, or the like may be employed, if desired, to clean the wellbore and surrounding formation of organic deposits such as paraffins or asphaltines. Optionally, the preflush to remove organic deposits may be followed by a preflush of HCl or an acid-organic solvent system to dissolve carbonates in the formation. Where the formation is acid sensitive, i.e., susceptible to an initial decrease in permeability upon contact with HCl, fluoboric acid is beneficially employed as the preflush as taught in copending application Ser. No. 824,753, filed concurrently herewith.

When fluoboric acid is so employed as a preflush, injection of the mud acid may immediately follow injection of the fluoboric acid if desired, but preferably, the well is shut in for at least a brief period to allow the fluoboric acid to react with clays in the formation prior to injecting the mud acid, particularly at formation temperatures of about 180° F. (82° C.) and less. Optimum results are achieved when the following minimum shut-in time is used, depending on the bottom hole static temperature (BHST) of the well.

| BHST | | Preferred Minimum Shut-in Time |
|---|---|---|
| °F. | °C. (calculated from ° F.) | Minutes |
| 100 | 38 | 5 hours |
| 110 | 43 | 4 hours |
| 120 | 49 | 3 hours |
| 130 | 54 | 2 hours |
| 140 | 60 | 1½ hours |
| 150 | 65 | 1 hour |
| 160 | 71 | 30 minutes |
| 170 | 77 | 20 minutes |
| 180 | 82 | 10 minutes |

When any desired preflushes have been completed, a suitable volume of mud acid is injected in a conventional manner at a matrix rate, i.e., at a rate which does not fracture the formation.

The fluoboric acid is injected following the mud acid, again at a matrix rate. Preferably, an injection rate of about ¼ barrel (42 gallon barrel) per 4 feet of perforations (about 33 liters/meter of perforations) is maintained to assure that migratory fines are not disturbed during the injection. The precise volume employed is not critical. A sufficient volume is preferably employed to obtain penetration of at least about 3 to 4 feet into the formation from the wellbore. Those skilled in the art can determine the approximate volume to use for a given depth of penetration if the porosity is known. Generally, however, about 85-100 gallons per foot (about 1-1.25 m³m/m) of perforations is suitable.

The fluoboric acid may be displaced from the wellbore with a suitable displacement fluid, e.g., an aqueous ammonium chloride solution. Potassium ions are generally to be avoided as they can cause a precipitate to form upon contact with the fluoboric acid. Also, a spacer such as an ammonium chloride or weak organic acid solution is preferably employed between the mud acid and the fluoboric acid overflush. The spacer prevents comingling of the mud acid with the fluoboric acid; comingling can otherwise accelerate the rate of reaction of the fluoboric acid, thereby decreasing the depth of penetration obtainable with the fluoboric acid solution. When a weak organic acid is employed, the weak organic acid is selected so as to contribute sufficient ionic character to the water to prevent formation shock, yet not appreciably increase the rate at which the fluoboric acid reacts with the formation. Other suitable spacers, e.g., liquid hydrocarbons, alcohols, and the like may also be employed.

Finally, the well is shut in for a period of time sufficient for the fluoboric acid to react with and stabilize the clays. The minimum shut in time depends on the temperature of the formation. While some benefits can be realized with somewhat shorter shut in times as is illustrated in the Examples which follow, optimum benefits are realized where the shut in times are at least about as long as the following:

| Bottom Hole Static Temperature | | Minimum Shut-in Time |
|---|---|---|
| °F. | °C. (calculated from ° F.) | Hours |
| 100 | 38 | 100 |
| 110 | 43 | 76 |
| 120 | 49 | 52 |
| 130 | 54 | 35 |
| 140 | 60 | 24 |
| 150 | 65 | 16 |
| 160 | 71 | 11 |
| 170 | 77 | 8 |
| 180 | 82 | 5 |

| Bottom Hole Static Temperature | | Minimum Shut-in Time |
|---|---|---|
| °F. | °C. (calculated from °F.) | Hours |
| 190 | 88 | 3 |
| 200–225 | 93–107 | 2 |
| 226–250 | 108–121 | 1 |
| 251–300 | 122–149 | 0.5 |

Longer shut-in times have not been found to be harmful.

ity can be improved by contacting the formation with dilute HCl following treatment with SGMA. Accordingly, the SGMA treated core was treated with a final slug of 7½% HCl. Results of these tests, shown in Table I, demonstrate that whereas SGMA tends to damage the formation, even after an HCl overflush, fluoboric acid tends to maintain or improve the original permeability. Treatment sequence is shown moving left to right in the Table.

TABLE I

| | | Permeability as Percent of Original, Ranger Formation Sand | | | |
|---|---|---|---|---|---|
| Run No. | | Base Permeability Established, 3% NH$_4$Cl | 2.7% HF Source | 3% NH$_4$Cl | 7½% HCl |
| 1 | SGMA: | 100 | 48 | 19 | 25 |
| 2 | HBF$_4$: | 100 | 119 | 102 | Not run |

EXAMPLES

The following examples and comparison tests further illustrate the practice of the present invention and its advantages over the prior art. All percents are weight percent.

For comparison purposes, laboratory quantities of compositions of the type disclosed in the above mentioned patent and paper by Templeton et al. were prepared. To prepare solutions which slowly generate 2.7 weight percent HF, 10.5 grams ammonium fluoride were dissolved in 20 ml of methyl formate and 100 ml of water, and the resulting solution was diluted with water to 200 ml. Adopting the term used in the Templeton et al. patent, such a solution is referred to in the remaining text as "2.7% SGMA"; although "SGMA" is a trademark of Shell Oil Company, use of the abbreviation SGMA herein does not imply the product tested was obtained from Shell Oil Company. A "3.5% SGMA" solution was prepared by dissolving 12.96 grams ammonium fluoride in 25 ml methyl formate and 100 ml water, and diluting the resulting solution to 200 ml.

SERIES ONE

Ranger formation sand is unconsolidated sand containing about 2.9 weight percent clay. A sample of the Ranger formation sand is about 33 percent soluble in mud acid and about 5 percent soluble in 15% HCl. For the tests in this series, about 85–90 grams of Ranger formation sand was packed in a rubber sleeve to give 3-inch long cores having a diameter of about 1 inch. Each core was flushed at 150° F. with about 20 pore volumes of toluene and about 20 pore volumes of 7½% HCl. Reference permeability to 3% NH$_4$Cl was established. One core was then treated with 20 pore volumes of 2.7% SGMA, and the other with 20 pore volumes of 12 percent fluoboric acid, which generates over time, about 2.7% HF. (Although the compositions of both the prior art and the present invention are normally injected following mud acid, the mud acid step was omitted for these tests since (1) the mud acid would mask the effects of the following compositions, and (2) the following compositions are intended to act on formation not reached by unspent mud acid.) Permeability of the cores to the SGMA and fluoboric acid solutions was determined, the respective cores were maintained exposed for a period of time to each of SGMA (18 hours, 140° F., which should be adequate according to FIG. 6 in SPE Paper 5153) and fluoboric acid (17 hours, 150° F.), and the final permeabilities to 3% NH$_4$Cl determined. The Templeton et al. patent teaches permeabil-

SERIES TWO

Berea sandstone is a consolidated sandstone containing about 2.4 weight percent total clay, i.e., about 1.6% kaolinite and about 0.8% illite. A 3-inch by 1-inch diameter core of Berea sandstone was flushed with API brine followed by about 20 pore volumes of 15% HCl and, 3% NH$_4$Cl which established a reference permeability. The core was then contacted with 10 pore volumes of 3.5% SGMA whereupon it was maintained at 150° F. for 4 hours. The core was then flushed sequentially with 3% NH$_4$Cl, 3% NaCl, and distilled water. Permeability as a percent of original is shown in Table II, with treatment sequence moving left to right in the Table. The reduced permeability with the SGMA solution and the following NH$_4$Cl solution confirm the results in Series One that SGMA is damaging to the formation. Also the permeability demonstrated with distilled water following the clay-sensitizing injection of NaCl shows that the SGMA gives some clay control.

TABLE II

| | Permeability as Percent of Original, Berea Formation Sandstone | | | | |
|---|---|---|---|---|---|
| Run No. | Base Permeability Established,3% NH$_4$Cl | 3.5% SGMA | 3% NH$_4$Cl | 3% NaCl | Distilled Water |
| 3 | 100 | 68 | 69 | 52 | 13 |

SERIES THREE

The tests in Series Three and Four demonstrate that fluoboric acid does not damage the formation, and that it stabilizes clays in the formation.

Berea sandstone cores, 3-inches by 1-inch diameter, were used for all four tests in this series. In each run, the permeability was first established with 3% NH$_4$Cl. In Run 4, the core was then contacted with 20 pore volumes of 12% HBF$_4$ at room temperature (about 70°–75° F.), and then maintained at 150° F. for 2 hours. The core was then flushed with another slug of 3% NH$_4$Cl to establish a final permeability. Run 5 was carried out in a similar manner, except only 7 pore volumes of the fluoboric acid were used, the fluoboric acid was injected at 150° F. instead of room temperature, and the core was shut in at 150° F. for 19 hours rather than 2 hours. In Run 6, the core was flushed with 15% HCl at 150° F. before establishing the reference permeability. Following the NH$_4$Cl solution 2½ pore volumes of the HBF$_4$ were injected at 150° F., and the core was shut in at 142° F. for 21 hours. After establishing the final permeability with NH4Cl, 3% NaCl was injected to sensitize the clays, and the core was then exposed to water. In Run 7, a control to show the effect of water on sensitized clays in a formation which has not been treated with fluoboric acid, the reference permeability was established with 3% NH4Cl, 3% NaCl was injected to sensitize the clays, and distilled water was then injected. Test conditions and results of this Series are tabulated in Table III, with treatment sequence moving from left to right in the Table.

shown in Table IV, with treatment sequence moving from left to right in the Table.

TABLE IV

| Run No. | Distilled Water | Mud Acid Pore Volumes | HBF4 Solution Pore Volumes | HBF4 Solution Shut-in Time (150° F.) | Distilled Water % Permeability | 6% NaCl Pore Volumes | Distilled Water % Permeability |
|---|---|---|---|---|---|---|---|
| 8 | ↑ | ←Omitted (control)→ | | | | 5 | 2 |
| 9 | Reference Permeability Established | 5 | 5(1) | 18 hr | 120 | 5 | 150 |
| 10 | ↓ | Omitted | 5(2) | 20 hr | 128 | 5 | 146 |

(1)4.7% HBF4
(2)9.4% HBF4

SERIES FIVE

Tests in this series, demonstrating use of HBF4 as a preflush to the mud acid, were carried out on Miocene sand, an unconsolidated sand which is about 40 percent soluble in 12% HCl/3% HF mud acid, and about 5.7 percent soluble in 15% HCl. The sand contains about 3.3% kaolinite, about 8.5% illite, and about 6.2% montmorillonite, for a total clay content of about 18%. For

TABLE III

| Run No. | Pore Volumes 15% HCl, 150° F. | 3% NH4Cl | 12% HBF4 Pore Volumes | 12% HBF4 Injection Temp. | 12% HBF4 Shut-in Temp. | 12% HBF4 Shut-in Time | 3% NH4Cl Permeability | 3% NaCl Pore Volumes | Distilled Water % Permeability |
|---|---|---|---|---|---|---|---|---|---|
| 4 | Omitted | ↑ | 20 | Room | 150° F. | 2 hr | 199% | Not run | Not run |
| 5 | Omitted | Reference Permeability Established | 7 | 150° F. | 150° F. | 19 hr | 315% | Not run | Not run |
| 6 | 18 | | 2.5 | 150° F. | 142° F. | 21 hr | 101% | 5 | 99% |
| 7 | Omitted | ↓ | ←Omitted (control)→ | | | | | 5 | 3% |

By comparing Run 6 with Run 7, the clay stabilizing effect of the fluoboric acid is apparent. Moreover, though test conditions were not identical, comparison of Runs 6 and 3 shows the fluoboric acid is considerably more effective than SGMA in stabilizing the clays.

SERIES FOUR

Tests in this series were carried out on Frio sand, an unconsolidated sand which is about 16 percent soluble in 12% HCl/3% HF mud acid, and which contains a total of about 8 weight percent clays, i.e., about 2.2% kaolinite, about 3.4 illite, and about 2.5% montmorillonite. Cores for this series were prepared by placing 200 g of the sand in a pressure loaded test cell of the type described in U.S. Pat. No. 3,934,455. Treating temperatures were maintained at 150° F. In this Series, permeability was established with distilled water, and the mud acid employed was 12% HCl/3% HF. In Run 10, the fluoboric acid solution was prepared from ammonium bifluoride, boric acid, and HCl, which yielded a solution containing about 9.4% HBF4, about 0.7% residual HF, and about 0.4% residual HCl. The fluoboric acid solution of Run 10 was diluted to a concentration of 4.7% HBF4 for Run 9. Test conditions and results are each test, thirty grams of sand were packed into a 4-inch by 1-inch inner diameter rubber sleeve fitted with screens and spacers at each end, to give a compressed core of about 1½-inch by 1-inch diameter. Tests were run in a Hassler Sleeve Core Test Apparatus. A sleeve pressure of 1500 psi and a back pressure of 800 psi were used in each test. A temperature of 150° F. was maintained throughout each test.

Each core was initially flushed with 3% NH4Cl also containing 10 volume percent ethylene glycol monobutyl ether to render the sand more water wet, and a reference permeability was established. In Run 11, the core was flushed with 5 pore volumes of 7½% HCl followed immediately by 5 pore volumes of 9.4% HBF4. The core was then shut in for 18 hours. In Run 12, the core was flushed with 5 pore volumes of 9.4% HBF4 and shut in for one hour. Next, 5 pore volumes of mud acid, and an additional 5 pore volumes of 9.4% HBF4 were injected and the core was shut in for 20 hours. Permeability of each core to 3% NH4Cl was determined after the final fluoboric acid shut in step, and in Run 12, permeability to distilled water after treatment with 5 pore volumes of 3% NaCl was determined. The tests are summarized in Table V.

TABLE V

| Run No. | 3% NH4Cl Surfactant | 7½% HCl % Permeability | 9.4% HBF4 % Permeability (1 hr shut-in) | Mud Acid % Permeability | 9.4% HBF4 overflush % Permeability | 9.4% HBF4 overflush Shut-in Period | 3% NH4Cl % Permeability | 3% NaCl Pore Volumes | Distilled Water % Permeability |
|---|---|---|---|---|---|---|---|---|---|
| 11 | ↑ | Not measured | Step Omitted | 1000 | 1300 | 18 | 1400 | Not run | Not run |

TABLE V-continued

| | | | Permeability as Percent of Original, Miocene sand | | | | | | |
|---|---|---|---|---|---|---|---|---|---|
| | | | 9.4% HBF$_4$ | | 9.4% HBF$_4$ overflush | | | | Distilled |
| Run No. | 3% NH$_4$Cl Surfactant | 7½% HCl % Permeability | % Permeability (1 hr shut-in) | Mud Acid % Permeability | % Permeability | Shut-in Period | 3% NH$_4$Cl % Permeability | 3% NaCl Pore Volumes | Water % Permeability |
| | Reference Permeability Established | | | | | | | | |
| 12 | ↓ | Step Omitted | 630 | 1700 | 2400 | 20 | 2100 | 5 | 2500 |

SERIES SIX

A core from the Wilcox formation was treated at room temperature with mud acid, and after about 15 minutes, its permeability had declined to about 5 percent of its original permeability. A 9.4% fluoboric acid solution was then injected, and within about 45 minutes, permeability of the core had been restored to about 45% of the original permeability; within about an hour, to about 80 percent of original permeability; and within about 80 minutes, to better than 200 percent of original permeability. A similar core from the same formation showed a gradual increase in permeability when contacted initially with fluoboric acid rather than mud acid.

What is claimed is:

1. A method for increasing the permeability of a subterranean formation comprising injecting into said formation in sequence:
   (a) an aqueous mud acidizing solution;
   (b) a spacer fluid selected from the group consisting of an aqueous solution of an ammonium halide or a weak organic acid, liquid hydrocarbons, and alcohols; and
   (c) an aqueous solution of fluoboric acid.

2. The method of claim 1 wherein the mud acidizing solution contains from about 1 to about 37 weight percent HCl and from about 0.5 to about 25 weight percent HF, and wherein the concentration of the fluoboric acid is from about 1 to about 48 weight percent.

3. The method of claim 2 wherein the mud acidizing solution contains from about 3 to about 25 weight percent HCl and from about 1 to about 10 weight percent HF, and wherein the concentration of the fluoboric acid is from about 2 to about 20 weight percent.

4. The method of claim 3 wherein the spacer is an aqueous solution of an ammonium halide or a weak organic acid.

5. A method for stimulating a siliceous clay containing formation to increase the production of fluids therefrom, wherein said formation is of the type which exhibits an initial production increase following a conventional mud acidizing treatment but which suffers a rapid production decline thereafter, which comprises injecting into said formation in sequence:
   (a) an aqueous mud acidizing solution; and
   (b) an aqueous solution consisting substantially of fluoboric acid, so that the permeability of said formation is increased and so that fines are stabilized within said formation, thereby permitting a prolonged period of increased production.

6. The method of claim 5 wherein the mud acidizing solution contains from about 1 to about 37 weight percent HCl and from about 0.5 to about 25 weight percent HF, and wherein the concentration of the fluoboric acid is from about 1 to about 48 weight percent.

7. The method of claim 6 wherein the mud acidizing solution contains from about 3 to about 25 weight percent HCl and from about 1 to about 10 weight percent HF, and wherein the concentration of the fluoboric acid is from about 2 to about 20 weight percent.

8. The method of claim 7 wherein the mud acid solution and the fluoboric acid solution are separated from one another during injection by a spacer comprising an aqueous solution of an ammonium halide or a weak organic acid.

9. The method of claim 8 wherein the spacer is an aqueous solution of an ammonium halide or a weak organic acid.

10. The method of claim 5 wherein the formation is also contacted with a preflush to dissolve carbonates prior to said mud acid.

11. The method of claim 10 wherein said preflush comprises aqueous fluoboric acid.

12. The method of claim 11 wherein the fluoboric acid preflush is shut in for a period of time prior to injection of the mud acidizing solution.

13. The method of claim 12 wherein the fluoboric acid solution injected in step (b) is shut in for a period of time.

14. The method of claim 5 wherein the fluoboric acid solution of step (b) is shut in for a period of time.

15. The method of claim 14 wherein the bottom hole static temperature of said well is from 100° F. to 300° F. and said shut in step is carried out for at least about as long as the following:

| Bottom Hole Static Temperature °F. | Minimum Shut-In Time Hours |
|---|---|
| 100 | 100 |
| 110 | 76 |
| 120 | 52 |
| 130 | 35 |
| 140 | 24 |
| 150 | 16 |
| 160 | 11 |
| 170 | 8 |
| 180 | 5 |
| 190 | 3 |
| 200–225 | 2 |
| 226–250 | 1 |
| 251–300 | 0.5 |

16. The method of claim 5 wherein said fluids are injected into said formation via a production well penetrating said formation.

17. A method for increasing the permeability of a subterranean formation comprising injecting into said formation in sequence:
   (a) an aqueous solution of hydrochloric acid;
   (b) a spacer fluid selected from the group consisting of an aqueous solution of an ammonium halide or a weak organic acid, liquid hydrocarbons, and alcohols; and (c) an aqueous solution of fluoboric acid.

18. A method for increasing the permeability of a subterranean formation penetrated by a wellbore having a bottom hole static temperature of from 100° F. to 300° F., comprising (a) injecting into said formation, an aqueous solution of fluoboric acid; and (b) shutting in said well with said fluoboric acid in contact with said formation, for a period of time substantially according to the following schedule:

| Bottom Hole Static Temperature °F. | Minimum Shut-In Time Hours |
| --- | --- |
| 100 | 100 |
| 110 | 76 |
| 120 | 52 |
| 130 | 35 |
| 140 | 24 |
| 150 | 16 |
| 160 | 11 |
| 170 | 8 |
| 180 | 5 |
| 190 | 3 |
| 200–225 | 2 |
| 226–250 | 1 |
| 251–300 | 0.5 |

19. The method of claim 18 including injecting an aqueous solution of hydrochloric acid in the formation ahead of said fluoboric acid injection step.

20. The method of claim 19 wherein the hydrochloric acid solution and the fluoboric acid solution are separated from one another during injection by a fluid spacer.

21. The method of claim 20 wherein the spacer is an aqueous solution of an ammonium halide or a weak organic acid.

22. The method of claim 18 including injecting an aqueous mud acidizing solution into the formation ahead of said fluoboric acid injection step.

23. The method of claim 22 wherein the mud acidizing solution contains from about 1 to about 37 weight percent HCl and from about 0.5 to about 25 weight percent HF, and wherein the concentration of the fluoboric acid is from about 1 to about 48 weight percent.

24. The method of claim 23 wherein the mud acidizing solution contains from about 3 to about 25 weight percent HCl and from about 1 to about 10 weight percent HF, and wherein the concentration of the fluoboric acid is from about 2 to about 20 weight percent.

25. The method of claim 22 wherein the mud acid solution and the fluoboric acid solution are separated from one another during injection by a fluid spacer.

26. The method of claim 25 wherein the spacer is an aqueous solution of an ammonium halide or a weak organic acid.

27. A method for increasing the permeability of a subterranean formation penetrated by a production well, comprising injecting into said formation in sequence via said production well:

(a) an aqueous mud acidizing solution; and (b) an aqueous solution of fluoboric acid.

28. The method of claim 27 wherein the mud acidizing solution contains from about 1 to about 37 weight percent HCl and from about 0.5 to about 25 weight percent HF, and wherein the concentration of the fluoboric acid is from about 1 to about 48 weight percent.

29. The method of claim 28 wherein the mud acidizing solution contains from about 3 to about 25 weight percent HCl and from about 1 to about 10 weight percent HF, and wherein the concentration of the fluoboric acid is from about 2 to about 20 weight percent.

30. The method fo claim 27 wherein the mud acid solution and the fluoboric acid solution are separated from one another during injection by a fluid spacer.

31. The method of claim 30 wherein the spacer is an aqueous solution of an ammonium halide or a weak organic acid.

32. The method of claim 27 which includes a final step of producing formation fluids from said production well.

33. The method of claim 27 which includes shutting in said well for a period of time with said fluoboric acid in contact with said formation, and thereafter producing formation fluids from said production well.

34. The method of claim 33 wherein the bottom hole static temperature of said well is from 100° F. to 300° F. and said shut in step is carried out for a minimum time at least about as long as the following:

| Bottom Hole Static Temperature °F. | Minimum Shut-In Time Hours |
| --- | --- |
| 100 | 100 |
| 110 | 76 |
| 120 | 52 |
| 130 | 35 |
| 140 | 24 |
| 150 | 16 |
| 160 | 11 |
| 170 | 8 |
| 180 | 5 |
| 190 | 3 |
| 200–225 | 2 |
| 226–250 | 1 |
| 251–300 | 0.5 |

35. A method for stimulating a siliceous clay containing formation to increase the production of fluids therefrom, wherein said formation is of the type which exhibits an initial production increase following a conventional mud acidizing treatment but which suffers a rapid production decline thereafter, which comprises injecting into said formation via a well penetrating said formation, an aqueous solution consisting substantially of fluoboric acid, so that the permeability of said formation is increased and so that fines are stabilized within said formation, thereby permitting a prolonged period of increased production.

36. The method of claim 35 including shutting the well for a period of time while the fluoboric acid is in contact with said formation.

37. The method of claim 36 wherein the bottom hole static temperature of the well is from 100° F. to 300° F. and the well is shut in for at least about as long as the following:

| Bottom Hole Static Temperature °F. | Minimum Shut-In Time Hours |
| --- | --- |
| 100 | 100 |
| 110 | 76 |
| 120 | 52 |
| 130 | 35 |
| 140 | 24 |
| 150 | 16 |
| 160 | 11 |

-continued

| Bottom Hole Static Temperature °F. | Minimum Shut-In Time Hours |
|---|---|
| 170 | 8 |
| 180 | 5 |
| 190 | 3 |
| 200-225 | 2 |
| 226-250 | 1 |
| 251-300 | 0.5 |

38. The method of claim 35 wherein said well is a production well.

39. The method of claim 35 including injecting an aqueous solution of hydrochloric acid into the formation ahead of said fluoboric acid injection step.

40. A method for stabilizing clays in a clay containing subterranean formation comprising contacting said clays with an aqueous fluoboric acid solution.

41. A method for increasing the permeability of a subterranean formation comprising injecting into said formation in sequence:
(a) an aqueous solution of fluoboric acid;
(b) an aqueous mud acidizing solution; and
(c) an aqueous solution of fluoboric acid.

* * * * *

UNITED STATES PATENT AND TRADEMARK OFFICE
CERTIFICATE OF CORRECTION

PATENT NO. : 4,151,879

DATED : May 1, 1979

INVENTOR(S) : Ronnie L. Thomas

It is certified that error appears in the above-identified patent and that said Letters Patent are hereby corrected as shown below:

Col. 2, line 9, after "which" insert --are--.

Col. 3, under heading "Metric" delete "0.388m" and insert --0.388 $m^3$--.

Col. 4, line 30, delete "m/m" and insert --/m--.

Col. 7, line 47, after "3.4" insert --%--.

Signed and Sealed this

Eleventh Day of September 1979

[SEAL]

Attest:

Attesting Officer

LUTRELLE F. PARKER

Acting Commissioner of Patents and Trademarks